(12) United States Patent
Abe et al.

(10) Patent No.: US 7,175,726 B2
(45) Date of Patent: Feb. 13, 2007

(54) CONTINUOUS RUBBER-STRIP FORMING APPARATUS AND PROCESS

(75) Inventors: Masayoshi Abe, Osaka (JP); Masaya Fujimoto, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 265 days.

(21) Appl. No.: 10/786,804

(22) Filed: Feb. 25, 2004

(65) Prior Publication Data

US 2005/0183810 A1   Aug. 25, 2005

(51) Int. Cl.
  *B29D 30/60*   (2006.01)
(52) U.S. Cl. .................. 156/117; 156/130; 156/195
(58) Field of Classification Search ............... 156/117, 156/130, 397
  See application file for complete search history.

(56) References Cited

U.S. PATENT DOCUMENTS

| | | | | |
|---|---|---|---|---|
| 1,827,416 A | * | 10/1931 | Birdsall | 141/1 |
| 2,680,880 A | * | 6/1954 | Corbett | 425/192 R |
| 3,782,428 A | * | 1/1974 | Cartwright et al. | 141/115 |
| 4,963,207 A | * | 10/1990 | Laurent | 156/117 |
| 5,156,781 A | * | 10/1992 | Böhm et al. | 264/40.1 |
| 6,372,070 B1 | * | 4/2002 | Iizuka et al. | 156/117 |
| 2002/0089077 A1 | * | 7/2002 | Ogawa et al. | 264/40.6 |
| 2003/0025238 A1 | * | 2/2003 | Ogawa | 264/211.12 |
| 2004/0089400 A1 | * | 5/2004 | Vargo et al. | 156/136 |

FOREIGN PATENT DOCUMENTS

| | | |
|---|---|---|
| JP | 5-177737 | 7/1993 |
| JP | 2001-198992 | 7/2001 |

* cited by examiner

*Primary Examiner*—Geoffrey L. Knable
(74) *Attorney, Agent, or Firm*—Jordan and Hamburg LLP

(57) ABSTRACT

An apparatus for continuously winding a rubber strip extruded from a rubber-strip extruding machine, on a tire-building drum, comprises: a rubber-strip extruding machine including a gear pump for delivering the rubber material outputted from the extruder to a forming nozzle; a tire-building drum on which a rubber strip is wound, the rubber strip outputted from the rubber-strip extruding machine and having a predetermined sectional shape; a first driver unit for moving the extruding machine relative to the drum; a second driver unit for driving the drum into rotation; a pressure roller for pressing the rubber strip against the drum when the rubber strip is wound on the drum; and a control unit for controlling the first driver unit; said controlling being made such that said extruding machine is moved relative to the drum when the drum is driven as rotated, as to sequentially wind the rubber strip on the drum.

5 Claims, 6 Drawing Sheets

Fig. 2
2A
2B
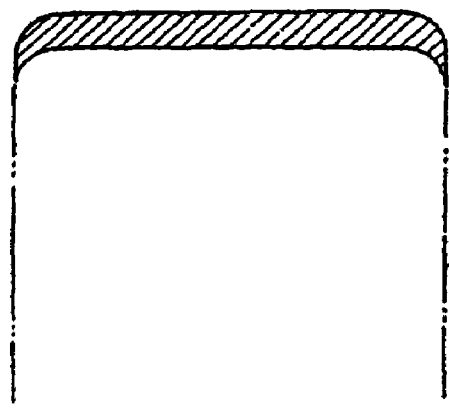
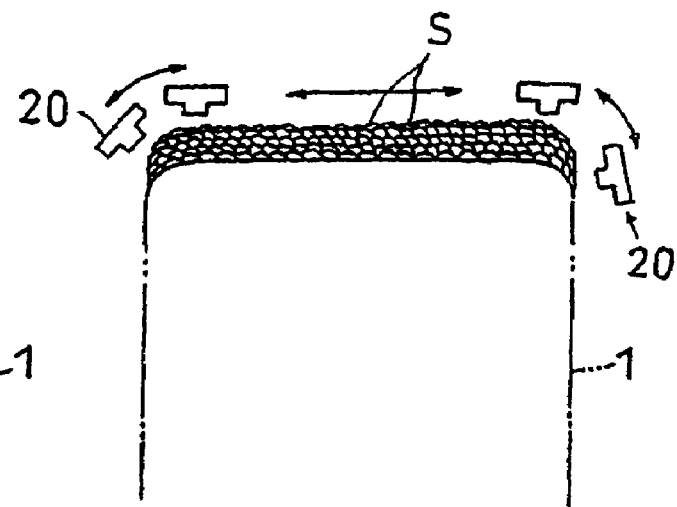

Fig. 5
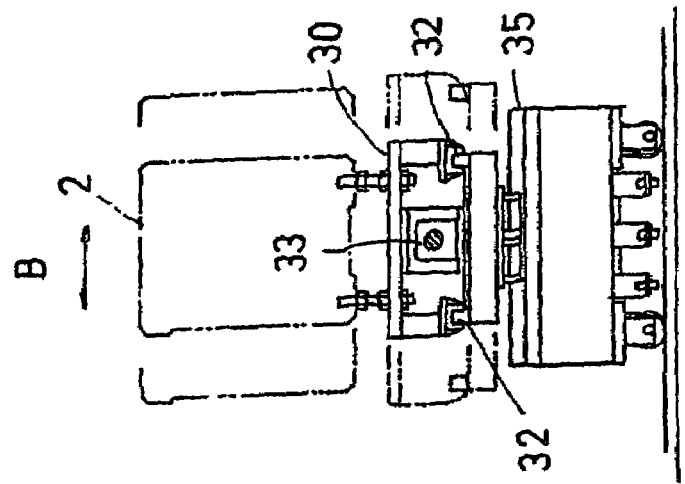
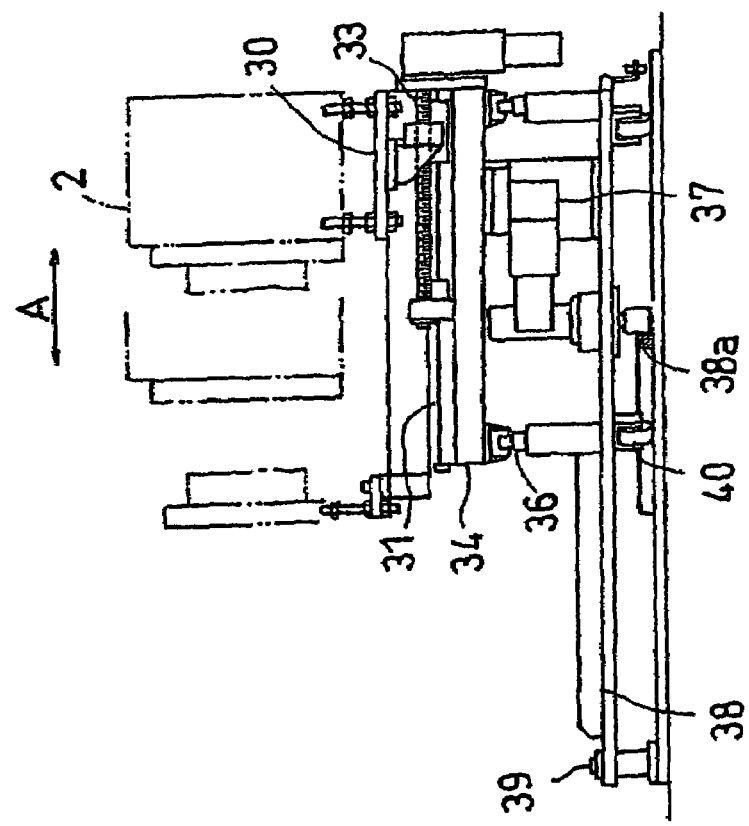

CONTINUOUS RUBBER-STRIP FORMING APPARATUS AND PROCESS

BACKGROUND OF THE INVENTION

1. Field of the Invention

The present invention relates to a continuous rubber-strip forming apparatus for building a tire by winding a rubber strip on a tire-building drum, and to a continuous forming process.

2. Background Art

There has been known a continuous rubber-strip forming apparatus, which takes the following procedure to form a rubber layer having a predetermined profile. While a ribbon-shaped rubber strip having a predetermined sectional shape is fed onto the tire-building drum driven as rotated, the rubber strip is moved along a drum shaft (rotary axis) of the tire-building drum whereby the rubber strip is wound on an outer periphery of the tire-building drum to form thereover the rubber layer of the predetermined profile. Known as such an apparatus is a rubber-strip winding apparatus disclosed in Japan Patent Registration No. 3177784.

The apparatus includes a strip feeder that is disposed at a drum driven as rotated and is movable in parallel with a drumshaft. The feeder includes a column and the like disposed on a base, the column on which the feeder is movable in parallel with the drum shaft by means of a transversely moving device. Thus, the apparatus is capable of continuously carrying out an automated, high-precision rubber winding operation on the drum driven as rotated, as reciprocally moving the rubber strip onto the drum. The rubber strip is continuously extruded from the rubber-strip extruding machine and fed into the feeder.

According to the aforesaid prior art, the rubber strip extruded from the rubber-strip extruding machine is fed to the tire-building drum by means of the feeder, which requires the mechanism for moving the feeder in parallel with the drum shaft. Accordingly, a distance between the forming nozzle of the rubber-strip extruding machine and the tire-building drum is increased. Furthermore, the feeder has a complicated mechanism. Hence, the apparatus tends to be increased in size.

In view of the foregoing, it is intended to provide a continuous rubber-strip forming apparatus for continuously winding the rubber strip, extruded from the rubber-strip extruding machine, on the periphery of the tire-building drum, the apparatus accomplishing the simplification of the feeder for feeding the rubber strip thereby avoiding the size increase of the apparatus. It is also intended to provide a continuous rubber-strip forming process.

SUMMARY OF THE INVENTION

According to the invention for solving the above problem, a continuous rubber-strip forming apparatus comprises: a rubber-strip extruding machine including an extruder having a screw for kneading a rubber material, and a gear pump for delivering the rubber material outputted from the extruder to a forming nozzle; a tire-building drum on which a rubber strip is wound, the rubber strip being outputted from the rubber-strip extruding machine as to have a predetermined sectional shape; a first driver unit for moving the rubber-strip extruding machine relative to the tire-building drum; a second driver unit for driving the tire-building drum into rotation; pressing device for pressing the rubber strip against the tire-building drum while the rubber strip is being wound on the tire-building drum; and a control unit for controlling the driver units, the controlling being made such that said rubber-strip extruding machine is driven to move relative to the tire-building drum when the tire-building drum is driven as rotated, as to sequentially wind the rubber strip on the tire-building drum.

The continuous rubber-strip forming apparatus of the construction has the following advantageous effects and mechanism.

The apparatus includes the rubber-strip extruding machine, the forming nozzle of which extrudes the rubber strip having a predetermined sectional shape. The apparatus further includes the first driver unit for moving the rubber-strip extruding machine relative to the tire-building drum. This movement is controlled by the control unit. The rubber-strip extruding machine itself is adapted to move so that the machine can move along the drum shaft of the tire-building drum. Therefore, the rubber feeder does not require the mechanism for moving the rubber strip along the drum shaft. This results in a simplified structure of the feeder such that the forming nozzle of the rubber-strip extruding machine may be located in proximity of the tire-building drum. Consequently, it is achieved simplification of the feeder for feeding the rubber strip and thereby avoiding the size increase, for the continuous rubber-strip forming apparatus that is for continuously winding the rubber strip, extruded from the rubber strip extruding machine, on the tire-building drum.

According to a preferred embodiment of the invention, the apparatus may be arranged such that the gear pump is reversely rotated to remove a residual pressure in the gear pump at completion of the rubber-strip winding operation.

When the rubber strip is extruded from the rubber-strip extruding machine, the gear pump is so rotated as to output a given amount of rubber strip. When the rubber strip winding operation is terminated, an excessive rubber may be outputted due to the residual pressure in the gear pump. Hence, the gear pump is reversely rotated as described above, thereby preventing the excessive rubber from being outputted.

According to another preferred embodiment of the invention, the control unit may provide controls in sequence at the start of the rubber-strip winding operation, thus bringing the forming nozzle into intimate contact with the tire-building drum, permitting the rubber strip to be outputted by means of the gear pump, and then moving the forming nozzle away from the tire-building drum by a predetermined distance.

When the rubber winding operation is started, the rubber-strip extruding machine is so moved as to bring the forming nozzle thereof into intimate contact with the tire-building drum. Then, the gear pump is normally rotated to output the rubber strip whereas the forming nozzle along with the rubber-strip extruding machine itself is moved away from the tire-building drum by the predetermined distance. Such an arrangement may reduce the distance between the forming nozzle and the tire-building drum. In addition, the structure of the feeder is simplified.

According to still another preferred embodiment of the invention, the continuous rubber-strip forming apparatus may further comprise a first servomotor for driving the tire-building drum; and a second servomotor for driving the gear pump, wherein the rotational speeds of the tire-building drum and the gear pump are individually set in a manner to eliminate the need for detecting sag in the rubber strip being conveyed from the forming nozzle to the tire-building drum.

If the amount of rubber strip extruded from the forming nozzle does not agree with the rotational speed of the tire-building drum, the rubber strip extended between the forming nozzle and the tire-building drum sustains sag. In order to eliminate the sag, a sag detection mechanism and a mechanism for controlling the rotations of the gear pump and the tire-building drum are required.

According to the above arrangement, the tire-building drum and the gear pump are individually driven with high precisions by means of the servomotors. The rotational speeds of the drum and the pump are theoretically defined so as to obviate the sag. Thus, the mechanisms for detecting and eliminating the sag are dispensed with.

According to still another preferred embodiment of the invention, the first driver unit may include a driving mechanism for permitting the rubber-strip extruding machine to be moved along: a first direction orthogonal to a rotary axis (i.e. to a drum shaft) of the tire-building drum; a second direction parallel to the rotary axis; and a third and rotational direction defining a swing movement about a predetermined axis.

The rubber-strip extruding machine can be moved relative to the tire-building drum by means of the first driver unit. The first driver unit is capable of moving the rubber-strip extruding machine in the first, second and third directions. This results in an increased degree of freedom of moving the extruding machine so that the apparatus can form a rubber layer having any profile.

For achieving the object of the invention, a continuous rubber-strip forming process according to the invention performed by a continuous rubber-strip forming apparatus that is comprised of: a rubber-strip extruding machine including an extruder having a screw for kneading a rubber material, and a gear pump for delivering the rubber material outputted from the extruder to a forming nozzle; a tire-building drum on which a rubber strip is wound, the rubber strip outputted from the rubber-strip extruding machine and having a predetermined sectional shape; a first driver unit for moving the rubber-strip extruding machine relative to the tire-building drum; a second driver unit for driving the tire-building drum into rotation; pressing device for pressing the rubber strip against the tire-building drum when the rubber strip is wound on the tire-building drum; and a control unit for controlling the driver units; said continuous rubber-strip forming process comprises: sequentially winding the rubber strip on the tire-building drum by controllably moving the rubber-strip extruding machine relative to the tire-building drum maintained as driven as rotated. Advantageous effects and manner of working of such an arrangement are those mentioned supra.

BRIEF DESCRIPTION OF THE DRAWINGS

FIGS. 2A and 2B are diagrams explaining how a rubber layer is formed from a rubber strip;

FIGS. 5A and 5B are a side view and a rear view showing the first driver unit.

DETAILED DESCRIPTION OF THE INVENTION

Figure 1:
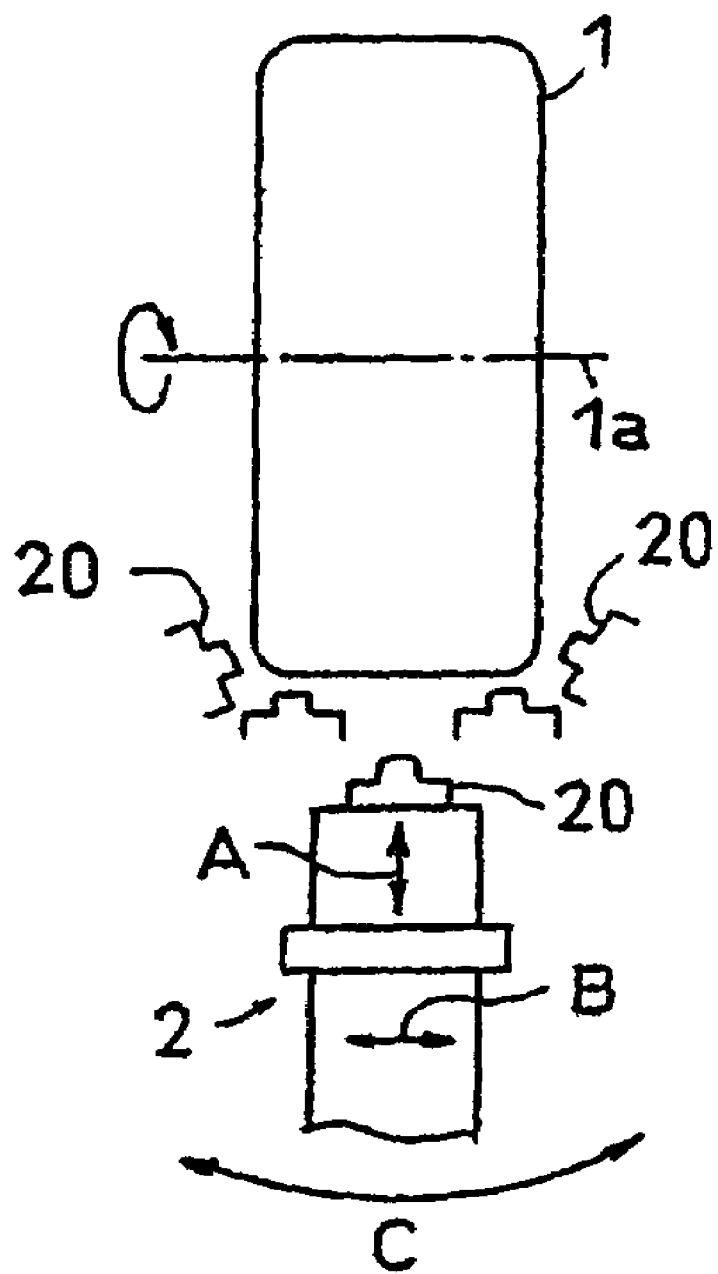
FIG. 1 is a plan view showing a positional relation between a tire-building drum and a rubber-strip extruding machine.

A continuous rubber-strip forming apparatus according to a preferred embodiment of the invention will be described with reference to the accompanying drawings. FIG. 1 is a plan view showing a positional relation between a tire-building drum and a rubber-strip extruding machine. FIGS. 2A and 2B are diagrams explaining how a rubber layer is formed from a rubber strip.

<Construction of Continuous Rubber-Strip Forming Apparatus>

Referring to FIG. 1, a tire-building drum 1 is driven into rotation about a drum shaft 1a by means of a second driver unit. The apparatus further includes a rubber-strip extruding machine 2 (hereinafter, simply referred to as "extruding machine"), which is driven by a first driver unit in three directions. More specifically, the three directions include a first direction "A" orthogonal to the drum shaft 1a, a second direction "B" parallel to the drum shaft 1a, and a third and rotational direction "C" defining a swing movement about a given axis. The extruding machine can be driven into each independent movement in each of the three directions or into a movement suitably combining any of the motions in the three directions. Thus, the extruding machine 2 can be moved in a complicated fashion.

FIG. 2A illustrates an example of a sectional shape of a rubber layer to be formed on an outer periphery of the tire-building drum 1. According to the invention, the sectional shape is formed by laminating a rubber strip "S" having a small sectional area. The rubber strip "S" may have a triangular sectional shape, for example. The use of the rubber strip "S" having such a sectional shape permits the formation of the rubber layer, the sectional shape of which may be changed in any way. In order to wind the rubber strip "S" on the tire-building drum 1, a forming nozzle 20 must be moved in conformity with the sectional shape or profile of the rubber layer. Hence, the extruding machine 2 is adapted to move in the three directions as shown in FIG. 1, thereby to move the forming nozzle 20 of the extruding machine 2 with a higher degree of freedom.

Figure 3:
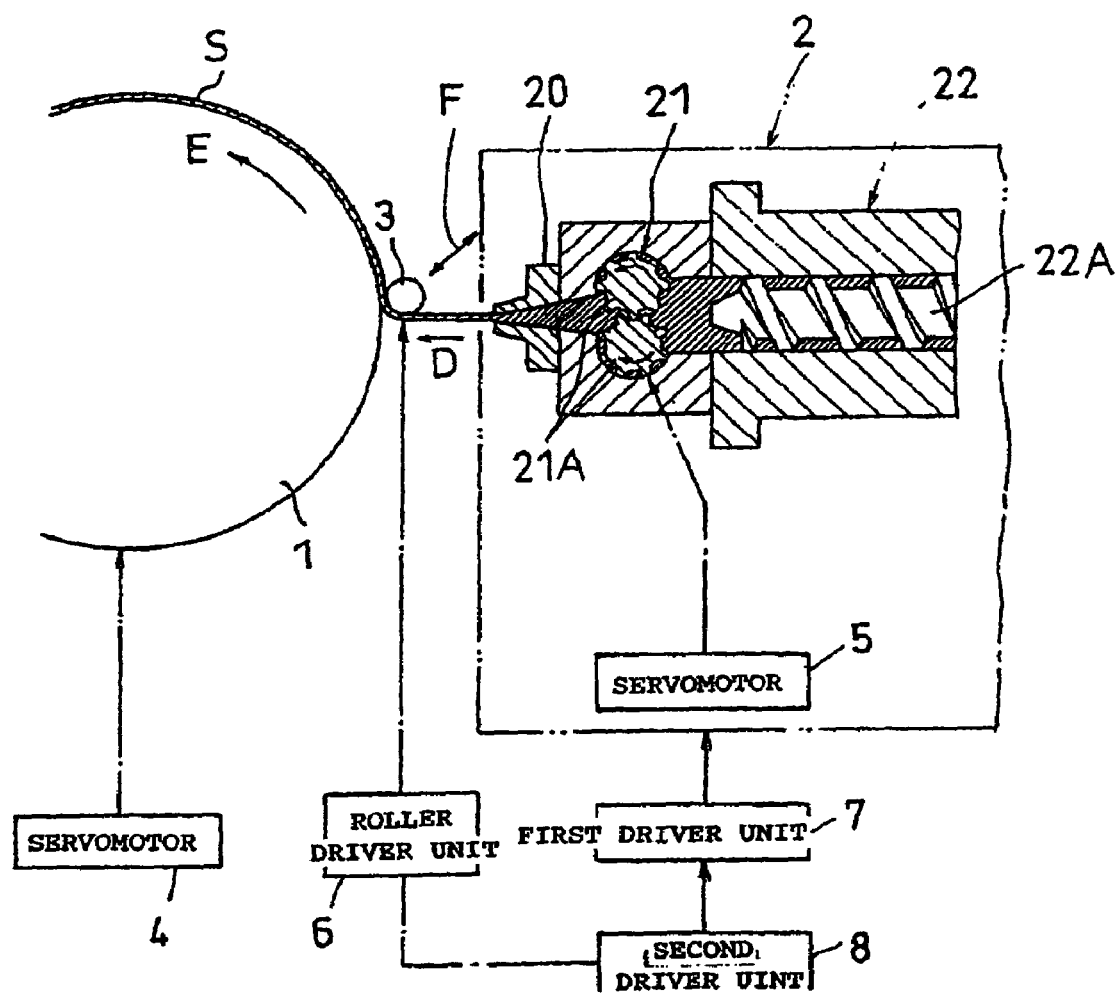
FIG. 3 is a side view showing a positional relation between the tire-building drum and the rubber-strip extruding machine.

FIG. 3 is a side view showing a positional relation between the tire-building drum 1 and the extruding machine 2. The extruding machine 2 includes the forming nozzle 20, a gear pump 21 And a sub-extruder 22. The forming nozzle 20 has such a die as to extrude a rubber strip of a predetermined sectional shape. The gear pump 21 includes two pieces of gears 21A for feeding a given amount of rubber material to the forming nozzle 20. The sub-extruder 22 includes a screw 22A for kneading the rubber material. Although FIG. 3 depicts the two pieces of gears 21A vertically arranged for convenience in illustrating the embodiment, the two gears are actually arranged along a plane of the drawing; that is, in a direction to direct their rotary axes vertically.

The rubber strip extruded from the extruding machine 2 is fed out along a direction of Arrow "D" so as to be sequentially wound on an outer periphery face of the tire-building drum 1 along a direction of Arrow "E". In order to wind the rubber strip on the tire-building drum 1, there is provided a pressure roller 3 (a kind of pressing device) operative to press the rubber strip against the tire-building drum 1. The pressure roller 3 is adapted for movement between a position close to the tire-building drum 1 and a position spaced away therefrom, as indicated by Arrow "F".

The tire-building drum 1 is driven into high-precision rotation (or driven as rotated with high precision) by means of a first servomotor 4 (a kind of second driver unit). The gear pump 21 is also driven into high-precision rotation by means of a second servomotor 5. The amount of rubber strip outputted from the forming nozzle 20 must agree or in harmony with the amount of rubber strip wound on the tire-building drum 1. It is possible to theoretically determine rotational speeds of the tire-building drum 1 and of the gear pump 21 that are required for satisfying this condition. The servomotors 4, 5 are responsible for the high-precision driving of the tire-building drum and gear pump in a manner to achieve such theoretical values. This obviates the occurrence of sag in the rubber strip extended between the forming nozzle 20 and the tire-building drum 1. It is thus ensured that the rubber strip is fed onto the tire-building drum 1 in a stable manner.

In a case where the rotational speeds of the servomotors are low in precisions, there is a fear of producing the aforesaid sag. Hence, there is a need to provide a mechanism for sag detection as well as to control the motor for driving the tire-building drum 1 and the motor for driving the gear pump 21 in a manner to eliminate the sag. However, the invention employs the servomotors featuring the high-precision drive and hence, the tire-building drum 1 and the gear pump 21 may be driven in a manner to obviate the occurrence of the sag. That is, the invention adopts a festoon-less system which dispenses with the sag detection.

Referring to FIG. 3, a roller driver unit 6 is provided for driving the pressure roller 3. In addition, there is provided a first driver unit 7 for moving the extruding machine 2 in any of the three directions "A", "B", "C" shown in FIG. 1. Furthermore, a control unit 8 is provided for controlling the roller driver unit 6 and the first driver unit 7.

<Construction of First Driver Unit>

Figure 4:
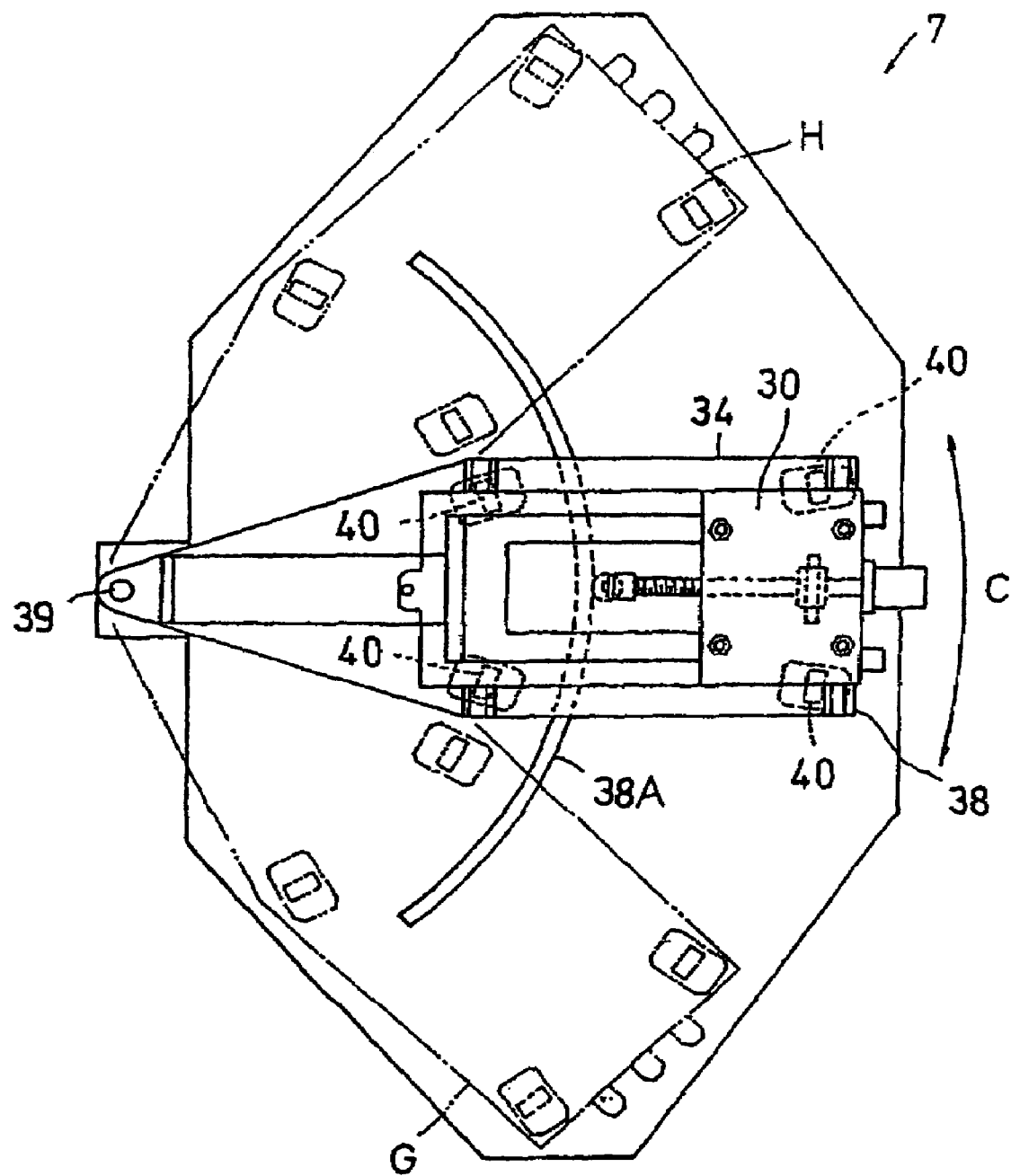
FIG. 4 is a plan view showing a first driver unit.

FIG. 4 is a plan view showing the first driver unit. FIG. 5A is a rear view of the first driver unit whereas FIG. 5B a side view thereof. The first driver unit 7 includes a mechanism for driving the extruding machine 2 into an independent movement in any of the three directions shown in FIG. 1. The extruding machine 2 is depicted with imaginary or two-dot chain lines in FIG. 5.

The extruding machine 2 is fixed to a first base 30. The first base is provided with a first linear guide 31, a first wheel 32, a ball screw mechanism 33 and a servomotor, which permit the extruding machine 2 to be moved in the direction of Arrow "A" in FIGS. 1 and 5. The mechanism for moving the extruding machine 2 in the direction of Arrow "A" is mounted on a second base 34. Disposed under the second base 34 are a second linear guide 35, a second wheel 36, a ball screw mechanism 37 and a servomotor, which permit the extruding machine 2 to be moved in the direction of Arrow "B".

A third base 38 is disposed at place near the floor. The third base is provided with a pivotal shaft 39, which is extended orthogonally to the drum shaft. The third base 38 is formed with an arcuate groove 38A such as to permit the extruding machine 2 to be swing-wise moved about the pivotal shaft 39, in the direction of Arrow "C". A third wheel 40 is fixed to a under side of the third base 38. Mounted on the third base 38 is the mechanisms for moving the extruding machine 2 in the directions of Arrows "A" and "B". The range of the swing movement of the extruding machine 2 is indicated by two-dot chain lines "G" and "H" in FIG. 4. A servomotor is also used for swing-wise moving the extruding machine 2. The swing movement of the extruding machine is implemented by means of a rack and pinion mechanism (not shown).

The aforementioned arrangement permits the extruding machine 2 to be moved in the three directions shown in FIG. 1. The driven-wise movement of the extruding machine in each of the directions "A", "B" and "C" may be controlled in an independent manner. Hence, by suitably combining any of the movements in the three directions, the extruding machine 2 may bring its forming nozzle 20 into a complicated movement in conformity with the profile of a tire to be built.

<Operations of Continuous Rubber-Strip Forming Apparatus>

Figure 6:
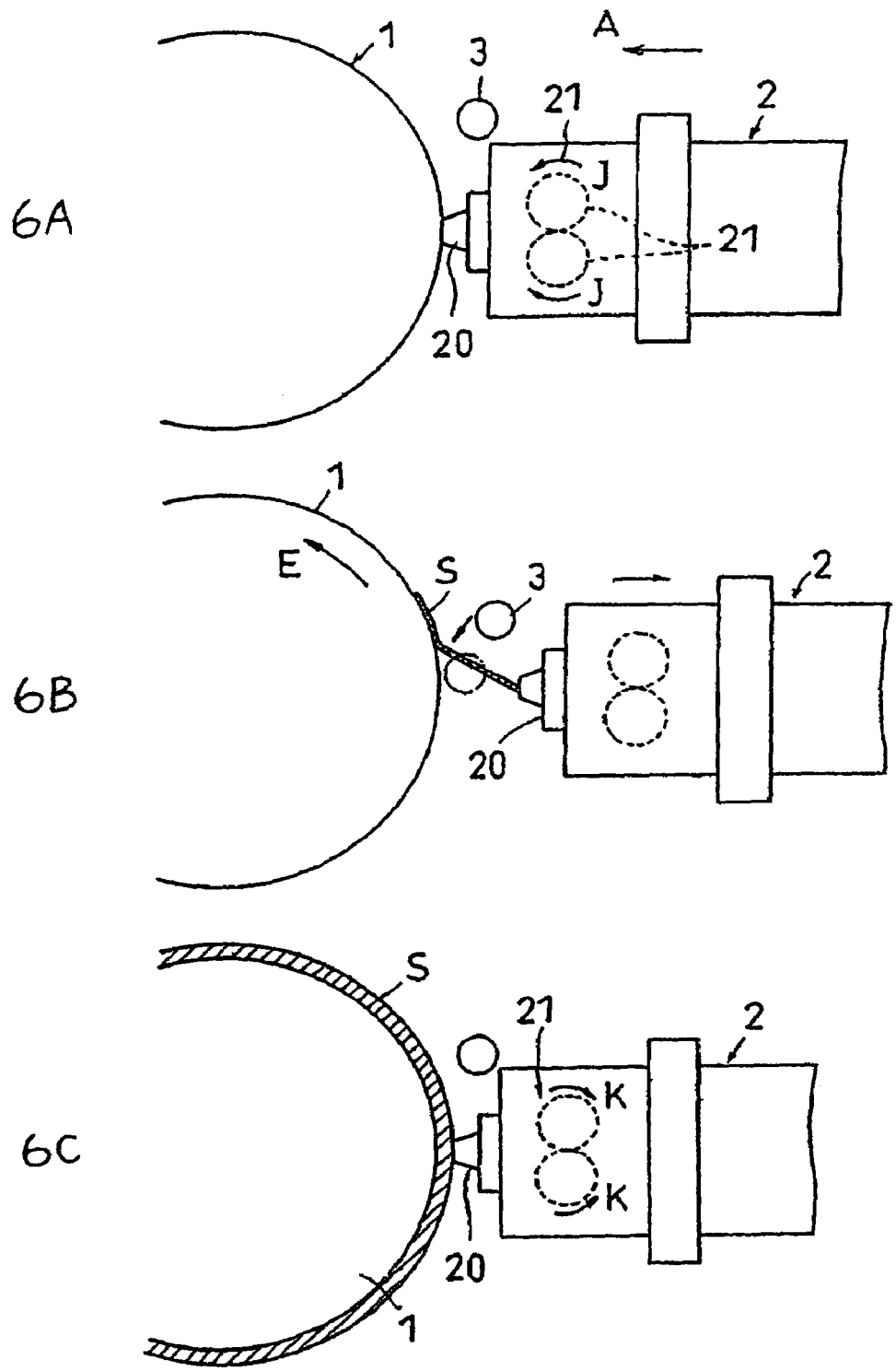
FIGS. 6A, 6B and 6C are diagrams illustrating operations for winding the rubber strip on the tire-building drum by means of the extruding machine.

Now referring to FIG. 6, description will be made on an operation of the extruding machine 2 for sequentially winding the rubber strip on the tire-building drum 1 in a spiral form.

Prior to the start of the winding operation, the forming nozzle 20 of the extruding machine 2 is spaced away by a predetermined distance from an outside surface of the tire-building drum 1; that is, at a "standby position". Next, the extruding machine 2 is moved in the direction of Arrow "A" by means of the first driver unit 7 thereby pressing the forming nozzle 20 thereof against the tire-building drum 1; see FIG. 6A. Then, the gear pump 21 is operated to drive the gears 21A into rotation in the directions of Arrows "J". Thus, the extruding machine starts outputting the rubber strip while a leading end of the rubber strip is brought into tight adhesion to the tire-building drum 1. At this time, the pressure roller 3 is at a retreated position.

Subsequently, the extruding machine 2 is retreated, in the opposite direction to Arrow "A" in FIG. 6A, so that the forming nozzle 20 is spaced away from the tire-building drum 1 by a predetermined distance; see FIG. 6B. At the same time, the tire-building drum 1 is rotated. In addition, the pressure roller 3 having been at the retreated position is moved to a pressing position. This permits the rubber strip (which is indicated by "S" in the figures) outputted from the forming nozzle 20 to be assuredly wound on the tire-building drum 1 as guided by the pressure roller 3; also see FIG. 3. While the rubber winding operation is performed, the extruding machine 2 is moved along a drum shaft of the tire-building drum 1 so as to take a complicated movement conforming to the profile of the layer to be formed. The movement of the extruding machine 2 in conformity with the profile is controlled by the control unit 8; see FIG. 3. The control unit 8 also stores therein a control program for effecting the movement.

The rubber winding operation may be terminated as follows. First, the rotational speed of the gear pump 21 is decreased (thereby decreasing the amount of outputted rubber strip), while the extruding machine 2 is again moved forwardly in the direction of Arrow "A" on FIG. 6A. In synchronism with this forward movement, the pressure roller 3 is moved to the retreated position. Then, the forming nozzle 20 is pressed against the tire-building drum 1; see FIG. 6C. Substantially at the same time, the rotation of the tire-building drum 1 is stopped while in same time the gear pump 21 is reversely rotated, in the directions of Arrows "K". The reverse rotation is made for the removal of a residual pressure in the gear pump 21. This prevents the forming nozzle 20 from inadvertently outputting an excessive rubber strip. At the point of time that the forming nozzle 20 is pressed against the tire-building drum 1, the rotation of the gear pump 21 is temporarily stopped so that the rubber strip is cut off. Subsequently, the extruding machine 2 is moved backward again. Thus, the extruding machine 2 is returned to the "standby position" and is ready for the subsequent operation.

The rubber layer of a tire to be formed by such a continuous rubber-strip forming apparatus includes, for example, a tread portion, side wall portion and the like. In a case where the tread portion is to be formed, a single extruding machine 2 may be used. In a case where the side wall portion is to be formed, it is preferred to provide two extruding machines in total, each extruding machine disposed on each of transversely (widthwise) opposite sides of the tire-building drum 1. It is not preferred to use a single extruding machine to form the side wall portion because the cycle time is detrimentally increased.

According to the above arrangement, the rubber strip outputted from the extruding machine 2 is directly stuck to the tire building drum 1. Therefore, a distance between the forming nozzle 20 of the extruding machine 2 and the tire-building drum 1 can be decreased. In addition, the feeder of the rubber strip only requires the pressure roller 3 and thus does not require a complicated structure. As a result, the continuous rubber-strip forming apparatus has a simplified, downsized structure, which contributes to the cost reduction. In addition, all the steps of winding the rubber strip may be automated.

The expression "wind the rubber strip on the tire-building drum" used herein, for example, includes not only the case where the rubber strip is directly wound on the tire-building drum but also a case where, as a matter of course, the rubber is further wound on the rubber already wound on the periphery of the tire-building drum. Other expressions related to the tire-building drum should be construed the same way.

What is claimed is:

1. A method of forming a continuous rubber strip, comprising:
    pressing a forming nozzle of a rubber strip extruding machine against an outer surface of a tire-building drum by moving the rubber strip extruding machine forwardly towards the outer surface of the tire-building drum;
    outputting the rubber strip with a predetermined sectional shape from an interior of the rubber strip extruding machine through the forming nozzle;
    bringing a leading end of the rubber strip into tight contact with the outer surface of the tire-building drum;
    initiating rotation of the tire-building drum when the rubber strip extruding machine is retreated, so that the forming nozzle is brought to a position in which the forming nozzle is spaced away from the tire-building drum by a predetermined distance;
    continuing rotation of the tire-building drum thereby accomplishing a winding operation in which the rubber strip is wound on the outer surface of the tire-building drum;
    pressing again the forming nozzle against the outer surface of the tire-building drum by moving again the rubber strip extruding machine forwardly towards the outer surface of the tire-building drum, at completion of the winding operation;
    stopping rotation of the tire-building drum; and
    stopping the outputting of the rubber strip thereby allowing the rubber strip to be cut off.

2. A method according to claim 1, wherein at completion of the winding operation, said step of outputting includes reversely rotating a gear pump which feeds the forming nozzle with rubber material for removing a residual pressure in said gear pump.

3. A method according to claim 1, wherein respective rotation speeds of the tire-building drum and a gear pump which feeds the forming nozzle with rubber material are individual set so as to eliminate a need for detecting sag in the rubber strip being conveyed from the forming nozzle to the tire-building drum.

4. A method according to claim 1, wherein said rubber strip extruding machine is movable along a first direction orthogonal to a rotary axis of said tire-building drum, a second direction parallel to said rotary axis, and a third and rotational direction defining a swing movement about a predetermined axis.

5. A method of forming a continuous rubber strip, comprising:
    moving a forming nozzle to a pressing position in which the forming nozzle is pressed against an outer surface of a tire-building drum;
    outputting the rubber strip from the forming nozzle;
    bringing a leading end of the rubber strip into contact with the outer surface of the tire-building drum;
    initiating rotation of the tire-building drum while moving the forming nozzle to a retreated portion in which the forming nozzle is spaced away from the tire-building drum by a predetermined distance;
    winding the rubber strip on the outer surface of the tire-building drum by continuing rotation of the tire-building drum; and
    returning the forming nozzle to the pressing position upon completion of the winding operation; and
    stopping rotation of the tire-building drum while concurrently stopping the outputting of the rubber strip.

* * * * *